(12) United States Patent
Cohn et al.

(10) Patent No.: US 6,687,883 B2
(45) Date of Patent: Feb. 3, 2004

(54) SYSTEM AND METHOD FOR INSERTING LEAKAGE REDUCTION CONTROL IN LOGIC CIRCUITS

(75) Inventors: John M. Cohn, Richmond, VT (US); Alvar A. Dean, Essex Junction, VT (US); David J. Hathaway, Underhill Center, VT (US); Sebastian T. Ventrone, South Burlington, VT (US)

(73) Assignee: International Business Machines Corporation, Armonk, NY (US)

(*) Notice: Subject to any disclaimer, the term of this patent is extended or adjusted under 35 U.S.C. 154(b) by 476 days.

(21) Appl. No.: 09/750,969

(22) Filed: Dec. 28, 2000

(65) Prior Publication Data

US 2002/0116440 A1 Aug. 22, 2002

(51) Int. Cl.$^7$ .......................... G06F 17/50; G06F 9/45; H03K 17/16; H03K 19/003
(52) U.S. Cl. .................. 716/4; 716/2; 716/6; 326/31
(58) Field of Search .................... 716/4, 2, 6; 326/31

(56) References Cited

U.S. PATENT DOCUMENTS

| | | |
|---|---|---|
| 5,508,937 A | 4/1996 | Abato et al. |
| 5,515,302 A | 5/1996 | Horr et al. |
| 5,682,320 A | 10/1997 | Khouja et al. |
| 5,870,308 A | 2/1999 | Dangelo et al. |
| 5,909,140 A | 6/1999 | Choi |
| 6,191,606 B1 * | 2/2001 | Ye et al. ................... 326/31 |
| 2003/0033580 A1 * | 2/2003 | Cohn et al. ................. 716/2 |

OTHER PUBLICATIONS

D. Lee et al., Analysis and Minimization Techniques for Total Leakage Considering Gate Oxide Leakage, Proceedings of the 40$^{th}$ Conference on Design Automation, pp. 175–180, Jun. 2003.*
T. Kitahara et al., Low Power Synthesis via Transparent Latches and Observability Don't Cares, 1997 IEEE International Symposium on Circuits and Systems, pp. 1516–1519, Jun. 1997.*
S. Iman et al., POSE: Power Optimization and Synthesis Environment, Proceedings of the 33rd Design Automation Conference, pp. 21–26, Jun. 1996.*
D. Lee et al., Static Leakage Reduction Through Simultaneous Threshold Voltage and State Assignment, Proceedings of the 40$^{th}$ Conference on Design Automation, pp. 191–194, Jun. 2003.*
S. Sirichotiyakul et al., Duet: An Accurate Leakage Estimation and Optimization Tool for Dual–Vt Circuits, IEEE Transactions on Very Large Scale Integration (VLSI) Systems, vol. 10, Issue 2, pp. 79–90, Apr. 2002.*
"Stand–by Power Minimization through Simultaneous Threshold Voltage Selection and Circuit Sizing", by Supamas Sirichotiyakul, et al., DAC 99, New Orleans, LA, 1999 ACM 1–58113–092–9/99/0006, pp. 436–441.
"Efficient Implementation of a BDD Package", by Karl S. Brace, et al., 27th ACM/IEEE Design Automation Conference, 1990 IEEE 0738–100X90/0006/0040, pp. 40–45.
Logic–Level Synthesis and Optimization, pp. 380–396.
"Fast Power Estimation of Large Circuits", by Peter H. Schneider, et al., IEEE Design & Test of Computers, 0740–7475/96, 1996 IEEE, pp. 70–78.
"Symbolic Boolean Manipulation with Ordered Binary–Decision Diagrams", by Randal E. Bryant, ACM Computing Surveys, vol. 24, No. 3, Sep. 1992, pp. 294–318.

* cited by examiner

Primary Examiner—A. M. Thompson
(74) Attorney, Agent, or Firm—Scully, Scott, Murphy & Presser; Richard M. Kotulak, Esq.

(57) ABSTRACT

A method for reducing leakage power of a logic network comprising the steps of: using (observability) don't care information to identify "sleep states" for individual nets; determining based on probabilistic analysis at least one net in which expected power consumption will be reduced by forcing a net to a particular value during at least a portion of a "sleep state"; and forcing the determined net to the determined value determined portion of that "sleep state".

46 Claims, 10 Drawing Sheets

FIG. 1
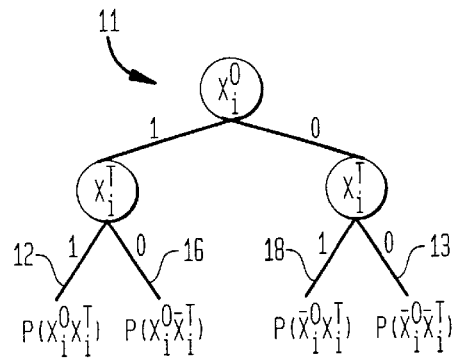
FIG. 7A
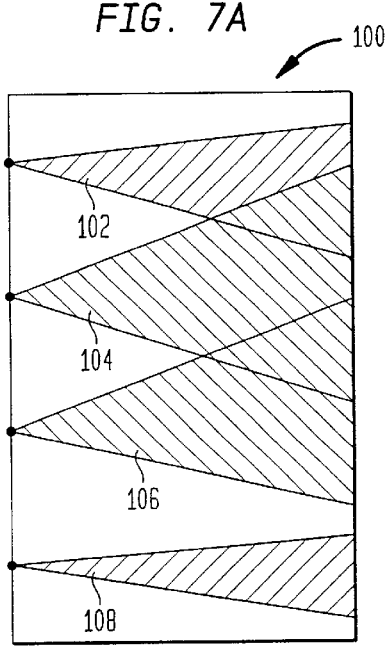
FIG. 7B
METHOD 1: ONE CHANGE AT A TIME
|  |  | a | b | c | d |
|---|---|---|---|---|---|
| STEP 1 | CHANGE | 0→1 | 0→1 | 0→1 | 0→1 |
|  | DELTA P | -3 | +5 | -8 | -1 |
| STEP 2 | CHANGE | 0→1 | 0→1 | 1→0 | 0→1 |
|  | DELTA P | -3 | +3 | +8 | -1 |
| STEP 3 | CHANGE | 1→0 | 0→1 | 1→0 | 0→1 |
|  | DELTA P | +3 | +3 | +8 | -1 |
| STEP 4 | CHANGE | 1→0 | 0→1 | 1→0 | 1→0 |
|  | DELTA P | +3 | +3 | +8 | +1 |
ALL POSSIBLE CHANGES INCREASE POWER.

ORIGINAL LOGIC

FORCE OUTPUT TO ONE

FORCE OUTPUT TO ZERO

FIG. 7C

METHOD 2: ONE CHANGE PER NON-OVERLAPPING
INPUT CLUSTER

CLUSTERS

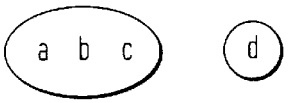

|  |  | a | b | c | d |
|---|---|---|---|---|---|
| STEP 1 | CHANGE | 0→1 | 0→1 | 0→1 | 0→1 |
|  | DELTA P | -3 | +5 | -8 | -1 |
| STEP 2 | CHANGE | 0→1 | 0→1 | 1→0 | 1→0 |
|  | DELTA P | -3 | +3 | +8 | +1 |
| STEP 3 | CHANGE | 1→0 | 0→1 | 1→0 | 1→0 |
|  | DELTA P | +3 | +3 | +8 | +1 |

FIG. 7D

METHOD 3: CHANGE ALL INPUTS IN MAXIMAL INDEPENDENT
SET OF INPUTS WHICH SHOW A POWER REDUCTION

COMPLETE INPUT OVERLAP GRAPH

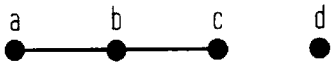

GRAPH OF INPUTS SHOWING POTENTIAL
POWER REDUCTION IN STEP 1

|  |  | a | b | c | d |
|---|---|---|---|---|---|
| STEP 1 | CHANGE | 0→1 | 0→1 | 0→1 | 0→1 |
|  | DELTA P | -3 | +5 | -8 | -1 |
| STEP 2 | CHANGE | 1→0 | 0→1 | 1→0 | 1→0 |
|  | DELTA P | +3 | +3 | +8 | +1 |

ALL POSSIBLE CHANGES INCREASE
POWER

ORIGINAL NETWORK

MODIFIED NETWORK

FIG. 9A

INVERTER

| INPUT | POWER |
|---|---|
| 0 | ⎞ 1.0 |
| 1 | ⎠ |

FIG. 9B

TWO-WAY NAND

| In1 | In2 | POWER |
|---|---|---|
| 0 | 0 | 1.0 |
| 0 | 1 | ⎞ 0.8 |
| 1 | 0 | ⎠ |
| 1 | 1 | 1.0 |

FIG. 9C

THREE-WAY NAND

| In1 | In2 | In3 | POWER |
|---|---|---|---|
| 0 | 0 | 0 | 0.05 |
| 0 | 0 | 1 | ⎞ |
| 0 | 1 | 0 | ⎬ 0.1 |
| 1 | 0 | 0 | ⎠ |
| 0 | 1 | 1 | ⎞ |
| 1 | 0 | 1 | ⎬ 0.8 |
| 1 | 1 | 0 | ⎠ |
| 1 | 1 | 1 | 1.5 |

FIG. 9D

| INPUT | STATE PROB. | SWITCH PROB. |
|---|---|---|
| A | 0.1 | 0.001 |
| B | 0.5 | 0.08 |
| C | 0.5 | 0.08 |
| D | 0.9 | 0.01 |
| E | 0.1 | 0.01 |

FIG. 11A

| NET | PROB. SWITCH | SWITCH POWER |
|---|---|---|
| X | 0.00846 | 0.846 |
| Y | 0.00846 | 0.846 |
| NX | 0.00846 | 0.846 |
| NY | 0.00846 | 0.846 |
| Z | 0.00995 | 1.99 |
| Q | 0.008154 | 0.8154 |
| R | 0.008154 | 0.8154 |

FIG. 11B

2-WAY NANDS

| GATE | PROB. 00 | PROB. 01 OR 10 | PROB. 11 | LEAKAGE POWER |
|---|---|---|---|---|
| GX | 0.45 | 0.5 | 0.05 | 0.495 |
| GY | 0.45 | 0.5 | 0.05 | 0.495 |
| GZ | 0.09 | 0.82 | 0.09 | 1.51 |
| GQ | 0.0855 | 0.869 | 0.455 | 0.74925 |
| GR | 0.0855 | 0.869 | 0.455 | 0.74925 |

FIG. 11C

INVERTERS

| GATE | PROB 0 | PROB 1 | LEAKAGE POWER |
|---|---|---|---|
| GNX | 0.95 | 0.05 | 1.0 |
| GNY | 0.95 | 0.05 | 1.0 |

FIG. 12A

| NET | PROB. SWITCH | SWITCH POWER |
|---|---|---|
| X | 0.00846 | 0.846 |
| Y | 0.00846 | 0.846 |
| NX | 0.00846 | 0.846 |
| NY | 0.00846 | 0.846 |
| Z | 0.00108 | 0.216 |
| Q | 0.008154 | 0.8154 |
| R | 0.008154 | 0.8154 |

FIG. 12B

2-WAY NANDS

| GATE | PROB. 00 | PROB. 01 OR 10 | PROB. 11 | LEAKAGE POWER |
|---|---|---|---|---|
| GX | 0.45 | 0.5 | 0.05 | 0.495 |
| GY | 0.45 | 0.5 | 0.05 | 0.495 |
| GQ | 0.0045 | 0.95 | 0.455 | 0.80595 |
| GR | 0.0045 | 0.95 | 0.455 | 0.80595 |

FIG. 12C

INVERTERS

| GATE | PROB 0 | PROB 1 | LEAKAGE POWER |
|---|---|---|---|
| GNX | 0.95 | 0.05 | 1.0 |
| GNY | 0.95 | 0.05 | 1.0 |

FIG. 12D

3-WAY NANDS

| GATE | PROB. 00 | PROB. 001,010,100 | PROB. 011,101,110 | PROB. 111 | LEAKAGE POWER |
|---|---|---|---|---|---|
| GZ | 0.081 | 0.747 | 0.163 | 0.009 | 0.65445 |

SYSTEM AND METHOD FOR INSERTING LEAKAGE REDUCTION CONTROL IN LOGIC CIRCUITS

BACKGROUND OF THE INVENTION

1. Field of the Invention

This invention relates generally to semiconductor devices, and more specifically, to a system and method for reducing leakage current in a semiconductor device by providing reduction control circuitry in accordance with a probability determination.

2. Discussion of the Prior Art

Two main approaches have been proposed for reducing leakage currents: threshold voltage control, and logic state control.

Since leakage current in integrated circuits is inversely proportional to the threshold voltage of FETs, raising the threshold voltage may reduce leakage current. However, raising the threshold voltage also decreases the performance of the device. Therefore, passive threshold voltage control methods typically comprise selecting a portion of the non-timing critical logic paths, and using higher threshold devices for that portion of the circuit. Active threshold control methods also exist in which the threshold voltage is dynamically adjusted by active body or well biasing when the chip is in a "stand-by" or "sleep" mode where full-performance is not required of the circuit and minimum leakage is desired.

Logic state control for leakage is based on the concept that a circuit's leakage is highly dependent on the state of its inputs. For example, a CMOS two-way NAND gate may have an order of magnitude less leakage current when both inputs are at a low voltage than when they are both at a high voltage. Leakage control in these methods consists of finding a set of logic values which, when applied to a logic network at its inputs, produces the lowest leakage state possible given the logic network. The set of logic values that causes this "low leakage state" may be called the "low leakage vector". The low leakage vector is applied to the network when the chip enters the "stand-by" or "sleep" modes of operation, by means of modified storage elements which force the low leakage vector onto the network.

One of the main challenges with this approach is finding the low leakage vector on large logic circuits. Since the number of possible logic states is directly proportional to the number of inputs to the circuit, it is impractical, if not impossible, to exhaustively check all possible states. Thus, heuristic algorithms have been developed to explore the state space and find "low leakage vectors". These algorithms are limited by the fact that they can only control the inputs to the circuit and thus will likely not find the "lowest leakage vector" possible.

Another limitation of the logic state control approach is that the distinction between "sleep" and "active" states is not always clear. Different parts of the design will be inactive (i.e., in a sort of "sleep" mode) for different amounts of time. In new technologies where the relative importance of leakage power relative to active switching power is increasing, reducing leakage of these inactive portions of the network becomes important even for relatively short periods of time.

In previous systems, leakage reduction techniques have focused on statically determining a low leakage vector that can be applied to the design upon entering a "standby" state, by means of forcing the storage elements to the low leakage vector.

There are techniques in the art that utilizes probabilistic information about the network state for optimizing digital circuit design. One reference in particular by S. Sirichotiyakul, T. Edwards, et al. entitled "Stand-by Power Minimization through Simultaneous Threshold Voltage Selection and Circuit Sizing". ACM 1999, Ch. 26.2, pp. 436–441. Specifically, this reference teaches that a probabilistic analysis may be used to size transistors and change voltage thresholds in order to reduce or minimize leakage. However, this prior art reference is not concerned with the circuit sleep state nor is it concerned with the setting of the logic state of signals in order to minimize leakage.

It would therefore be highly desirable to provide improved methods and mechanisms for finding a low leakage vector by using probabilistic approaches to find the expected leakage of integrated circuit devices at any point in time, based on logic state statistics.

It would therefore be highly desirable to provide an improved method and mechanism that allows manipulation of logic that results in changes to the probabilities so that the circuit may be in an optimized state, either globally or locally, when the semiconductor circuit is in an idle condition.

Furthermore, it would be highly desirable to provide improved methods and mechanisms for finding a low leakage vector by using probabilistic approaches that permit logic optimization for reducing leakage current even while the circuit is "active", thus accommodating the indistinct line between "sleep" and "active" mode operation.

SUMMARY OF THE INVENTION

It is an object of the present invention to provide a logic system design methodology that forces the states of logic gates based on a probabilistic analysis in order to reduce the leakage.

It is a further object of the present invention to provide a method and mechanism for finding leakage probabilities during synthesis to modify the network such that it results in a lower leakage design during any of the many active/semi-active/standby states.

It is another object of the present invention to provide a logic system design methodology implementing a probabilistic analysis for reducing the leakage during any of the many active/semi-active/standby states without making device accommodations, or adding special switches, to result in a lower overhead.

It is yet another object of the present invention to provide a method and mechanism for forcing the logic states exploiting the intrinsic nature of the gates during synthesis to modify the network such that it results in a lower leakage design.

The present invention overcomes the difficulty of finding the exact low leakage vector by using probabilistic approaches to find the expected leakage at any point in time, based on logic state statistics. This enables logic optimization to reduce leakage current even while the circuit is "active", thus accommodating the indistinct line between "sleep" and "active" mode operation. The probabilistic information may be computed and stored by several techniques not unlike those techniques used to determine switching information for analysis of switching power. Information may be gathered on individual nets as a result of a simulation trace. Alternatively, the probabilities of various input states (sets of primary input and latch output logical values) may be tracked in order to keep track of correlations between signals. Such input state information may be stored compactly using binary decision diagrams (BDDs) or other well-known means. Given for each signal the probability of that signal being at a particular value (either independent of all other signal values or correlated through state information) and information for each block in the logic network about the leakage of that block for each possible combination of input values, the estimated leakage power may be computed by summing over all blocks: the sum over all combinations of block input values of the leakage under that combination of input values multiplied by the probability of occurrence of that combination of input values. As changes are made to the logic network which affect these signal probabilities, the probabilities may be updated and the resulting change in leakage power may be estimated. The signal probability updates may be achieved by re-simulating part or all of the logic network, by recomputing probabilities on nets in the fanout cone of logic changes based on updated probabilities at the inputs of the gates driving the nets, by some combination of these, or by other means.

Along with signal probabilities, and in a similar manner, there is computed, for each state, the probability that any given signal net will switch when the network is in that state. Again, this may be done by treating the various nets in the network independently in which case the switching probabilities of interest are merely the conditional probability that the net will go high given that it is low, and the conditional probability that the net will go low given that it is high. These switching probabilities may also be computed based on global states using BDDs or by other means. This information will be used to determine the relative importance of reducing leakage on the net, by helping determine how long the net is likely to be in a particular state and thus dissipate the leakage power associated with that state.

When significantly distinct modes of operation are known, separate sets of probabilities and consequent leakage power estimates may be maintained for each mode. Optimizations may then be implemented to reduce a weighted sum of these different mode powers based on the expected periods spent in each mode and the importance of power reduction in each mode (for example, a device operating on either battery power or wall power will need to reduce power more in the former mode than in the latter). Note that in some modes, certain logic network input values (primary inputs or latch outputs) will be known and will, therefore, have state probabilities of zero and one. Even though the value of a primary input cannot be controlled, a particular mode may be defined as one in which a particular primary input is in a defined state.

Given this probabilistic leakage information, a variety of optimizations to reduce leakage power is performed. Generally, these methods will take advantage of "don't care" states in the logic, i.e., conditions at the input to a gate or sub-network for which it does not matter what the gate or sub-network output values are. These don't care conditions may be determined through specifications in the high level language input (e.g., a default case in a case statement), through analysis of the logic network, or by a combination of these. Similarly, the logical conditions under which particular nets or sets of nets are don't cares may similarly be determined by some specified signal (e.g., a "sleep mode" signal for the particular function or for the entire chip), by an analysis of the logic network (i.e., determination of the logical function which implies a don't care), or a combination of these. Note that the entire don't care function does not have to be used in the optimizations (i.e., changes do not have to be made for all don't care conditions which reduce the leakage), as long as the function chosen to determine when changes may be made always means that the signal is a don't care. In other words, functions are sought which are sufficient to determine that the signal is a don't care, but which need not be necessary for it. Additionally, it should be noted that there may be an interaction between the don't care functions and the leakage associated with a particular net. For example, a signal may be a don't care, both in some mode A in which increasing the signal probability decreases leakage and in some mode B in which decreasing the signal probability decreases leakage. Obviously, it is an objective to make changes which drive the signal probability in different directions in these two modes.

According to the invention, there is provided a method for reducing leakage power of a logic network comprising a plurality of nets, comprising the steps of: determining observability don't care (ODC) information for one or more nets in said logic network, the ODC information representing a set of inputs for which an input value at the net has no influence on an output value of the logic network, the ODC being used for identifying sleep states for individual nets of the logic network; performing a simulation to force the nets to a particular value during at least a portion of a sleep state and performing a probabilistic analysis to determine at least one net in which expected power consumption will be reduced; and forcing the determined net to the value determined for the portion of that sleep state when expected power consumption is reduced.

Advantageously, the conventional logic synthesis techniques employed for optimizing these don't care states in order to reduce leakage power may be used to reduce area, improve circuit performance, and sometimes to reduce switching power. Thus, simultaneous optimization for several different objectives may be attempted. These may be combined by taking a weighted sum of the affect of the change on the various objective functions (e.g., K1*delta-area+K2*delta-switch-power+K3*delta-leakage-power) and choosing optimizations which give the best improvement in this weighted sum. Such cost-based changes may also be subject to constraints, e.g., make the change which gives the best improvement in the weighted objective function sum given above, as long as no net slack goes below some threshold value.

BRIEF DESCRIPTION OF THE DRAWINGS

Further features, aspects and advantages of the apparatus and methods of the present invention will become better understood with regard to the following description, appended claims, and accompanying drawings where:

FIG. 1, illustrates a BDD tree structure depicting signal switching probability changes at times $X^0{}_1$ and $X^T{}_1$ of a net function.

FIG. 7(a) illustrates an example logic network 100 used in an example low leakage vector search in accordance with FIGS. 7(b)–7(d).

FIG. 7(b) illustrates the results of a low leakage vector found for the network of FIG. 7(a) in accordance with a first search approach.

FIG. 7(c) illustrates the results of a low leakage vector found for the network of FIG. 7(a) in accordance with a clustering approach.

FIG. 7(d) illustrates the results of a low leakage vector found for the network of FIG. 7(a) in accordance with a graph coloring approach.

FIGS. 9(a)–9(c) illustrate the leakage power tables for the gates used in the example logic network 150 of FIG. 8(a).

FIG. 9(d) illustrates signal (state) probabilities on the primary inputs A–E of the example logic network 150 of FIG. 8(a).

FIG. 11(a) illustrates the probabilities and resulting switching power for each net indicated in the example logic network 150 of FIG. 8(a).

FIGS. 11(b) and 11(c) illustrate the probabilities and resulting leakage power for each gate of the example logic network 150 of FIG. 8(a).

FIG. 12(a) illustrates the probabilities for and resulting switching power for each net in the modified network 150' of FIG. 8(b).

FIGS. 12(b)–12(d) illustrate the probabilities and resulting leakage power for each gate in the modified network 150' of FIG. 8(b).

DETAILED DESCRIPTION OF THE PREFERRED EMBODIMENTS

Figure 2:
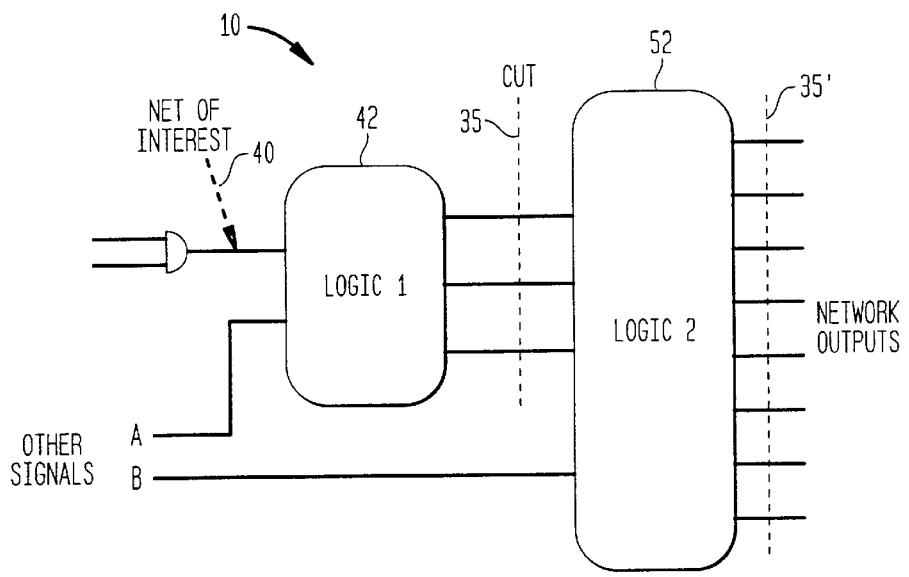
FIGS. 2 and 3 illustrate example methods for defining cuts in the logic network having logic blocks which cuts intercept all paths from a net of interest for which ODCs are to be computed.

According to the principles of the invention, a first phase analysis is performed to ascertain the static and switching probabilities for various nets (networks) of the circuit to be synthesized. This analysis preferably involves an incremental probabilistic analysis of the leakage which is required in order to optimize the logic circuit design. In the algorithm, use is made of binary decision diagrams (BDD's) which represent Boolean functions such as known by skilled artisans. A detailed overview of Boolean functions and their properties is provided in the reference to Randal E. Bryant "Symbolic Boolean Manipulation with Ordered Binary-Decision Diagrams". ACM Computing Surveys. Vol. 24, No. 3, September 1992 and incorporated by reference as if frilly set forth herein. A BDD is basically a binary tree representing a function that depends on some number of variables. When a variable is restricted to a particular logic state value (e.g. "0") the function changes and is dependent upon a subset of the original variables. This process, known to skilled artisans as Shannon cofactoring, is repeated so that the function resolves to a function of one variable. Therefore, for any assignment of the input variables, the value of the function may be determined by traversing the path through the tree function. Typically, when referring to a BDD it is understood that it is a reduced ordered diagram where variables along any path from root to leaves are always encountered in a defined order (although not all variables need be present on all paths) any two nodes that have the same variable and same children will be merged, and any node whose two children (for the variable restricted to zero and to one, respectively) are the same will be removed. Many other manipulations of and operations to BDDs are known in the industry. Data structures for representing and efficiently manipulating reduced order BDDs for computer-aided design tasks are described in the reference to Karl S. Brace, et ad. entitled "Efficient Implementation of a BDD Package" and are well known in the industry. A computer package providing this function is available for instance by Synopsys, Inc. of Mountain View, Calif.

According to this first phase analysis, for purposes of discussion, a "net" in a digital circuit network is represented by a BDD, with each node in a BDD structure having a primary input as a decision variable that determines the path taken through the BDD, and thus the value of the net. Once a BDD is created, the probability that the net represented by the BDD is at a particular state may be determined, for example as described in the above-referenced "Symbolic Boolean Manipulation with Ordered Binary-Decision Diagrams" to Bryant. Typically, using high-level simulations, the probabilities at the primary inputs would be determined first, and then, the probabilities of nets internally are determined making use of the BDD. According to the invention, however, the network may be changed which does not facilitate probability determinations using the high level simulation. Thus, computing a signal probability using a BDD starts at leaves with known probabilities. For example, a node zero is one with a probability zero (it is always zero) and a node one is one with a probability one. Consider a node in the BBD that has children that are just zero and one; there will always be at least one node with that property. If the decision variable for that node has a probability of one-quarter of being one, then if the function represented by that node is one when the variable is one and zero when it is zero, then that function has a probability of one-quarter of being one. If, instead, it is zero when it is one and one when it is zero, in other words, if the node represents the inverse of the variable, then it has a three-quarters probability of being one. Thus, for each node in the BBD, this computation may be performed i.e., the probability of the function represented by the node is the probability that the decision variable for the node is one times the probability that the one child of the node is one, plus the probability that the decision variable for the node is zero times the probability that the zero child of the node is one—a simple summation. This is performed recursively, e.g., using a post-order depth-first search traversal of the tree. Thus a probability may be found for any node in this tree, giving the probability that the net that has the function represented by that node is a one.

It is understood that this technique is for determining the static probability, i.e., the probability of the value of the signal is one or, the probability that the signal is a zero. According to the invention, additional consideration is made of the switching probability because if something is switching every cycle (or even if it is switching every third cycle or every tenth cycle), it may not be desirous to force it to a particular state because the overhead of forcing the signal to a particular state is going to be greater, i.e., the power exerted in making that transition will be greater, than the leakage power that would have been saved over a very short period of time. Thus, preferably these techniques are to be applied in cases where the signal has a high probability of being a don't care for a long time. It does not even have to be a high probability, but it has to be probable that when it is a don't care, it is a don't care for a long time.

Looking at the switched probability aspect, reference is made to Peter H. Schneider, et al., "Fast Power Estimation of Large Circuits" IEEE Design and Test of Computers, 1996, pp. 70–78, the contents and disclosure of which is incorporated by reference herein. This reference is basically the same idea as the static technique however, besides creating a BBD for a net having one set of primary inputs representing one slice in time, e.g., current variable inputs X1, X2, ..., Xn, a BBD for that net is created for the next consecutive slice in time, e.g., as a function of next state variable inputs $X^T_1, X^T_2, \ldots, X^T_n$. These sets of BBDs are identical because the net structure does not change from cycle-to-cycle. Thus, for any particular transition, given the variables in a previous state, it is known what the variables are in the next state. These two BDDs may then be exclusively OR'd to create a new BBD which represents a new function that is now a function of both current state and next state variables. This new function (combined BDDs) is one which directly represents when the signal switches between a pair of consecutive cycles.

Preferably, as described in above-incorporated Schneider, et al. reference entitled "Fast Power Estimation of Large Circuits" in order to be able to compute the switching probability, the created BBD is specially ordered by interleaving the variables between the current state and the next state. For example, input variables $X^0_1$ and $X^T_1$ represent variables in the current state (defined with a zero superscript) and in the next state (defined with a T superscript), respectively. Thus, when the $X^0_1$ and $X^T_1$ variables are placed adjacent, the same kind of probabilistic analysis that was performed with static states, but now may be done with a pair of variables at a time. Thus, as described in the Schneider, et al. paper, and illustrated by the BDD tree structure 11 in FIG. 1, the probabilities given illustrate that when $X^0_1$ and $X^T_1$ are both one, this corresponds to the leftmost branch 12 of this tree where the variable was one and stayed one at the next cycle. Likewise, the rightmost branch 13 of this tree II is the case where it was zero and it stayed zero. Now the intermediate cases illustrate where switching occurs so when the path traverses to the left and then to the right branch 16, that represents where the variable was one and it went to zero in the next cycle. In other words, it was falling during this transition. The other remaining path 18 is a one, which indicates a signal rising during the transition.

Once all of the statistics are gathered through the high level simulation it is the case that not only are statistics gathered concerning the probability that a signal is zero, but also statistics on the probability that it switches. By looking at two levels of the BBD at a time whose decision variables correspond to the present and next state values of an input signal, a slightly more complicated analysis may be performed that essentially requires operations for multiplying the probability that the input signal corresponding to the decision variable was one and stayed one with the probability on that branch, and multiplying the probability that the input signal corresponding to the decision variable was one zero and stayed zero with the probability on that appropriate branch and, then adding the other two branch probabilities together (because the rising probability is always equal to the falling probability) and multiplying that value with the probability that the input variable corresponding to the decision variable switched. Propagating those probabilities up the tree results in a probability at the root representing the probability that this signal switched between any consecutive pair of cycles.

It is understood that in order to efficiently make and evaluate multiple changes in a logic network, these operations have to be performed incrementally. For instance, as described in commonly-owned issued U.S. Pat. No. 5,508,937 entitled INCREMENTAL TIMING ANALYSIS, the contents and disclosure of which is wholly incorporated by reference as if fully set forth herein, an analysis method is described which involves performing an incremental propagation of data forward through a network in an efficient manner. These steps involve for example, first performing an initial analysis to find the switching probability on all the nets in the network, and then make some logical change, for example, forcing a logic one state at a gate input. Rather than having to start all over again and do the analysis for the entire network, the change may be introduced and propagated for only as far as it is necessary in order to update the values. Thus, in accordance with the preferred embodiment of the invention, the method described herein for determining the state and switching probabilities are applied with the incremental update mechanism according to U.S. Pat. No. 5,508,937.

Besides the creation and implementation of BDDs for representing network functions and the means for determining the state of a signal and the switching probability of a signal and how to update that when a change is made in the network, a next phase of analysis requires the computation and evaluation of "don't care" conditions, and specifically observability don't cares or "ODCs" which represent the set of inputs for situations when an output is not observed by the environment, i.e., we don't care about the value of the net. The ODC (observability don't care) set for a net in a logic network is the set of conditions (i.e., input vectors of the logic network) under which the value on the net has no influence on any primary output of the logic network nor on any value to be stored into a latch in the logic network. Thus, the network may be modified to allow the net to take on any chosen value under these ODC conditions without affecting the function (the observable outputs or latch contents) of the logic network.

The computation of the ODCs may be done in many ways. A detailed description of algorithms for computing ODCs within the Boolean model are found in the book entitled "Synthesis and Optimization of Digital Circuits" by Giovanni De Micheli, 1994, McGraw-Hill Publishing, Chapter 8, pp. 380–396, the contents and disclosure of which is incorporated by reference as if fully set forth herein. In the context of the invention, an ODC set is synonymous with a sleep mode of operation of an electronic device which is different than the traditional sleep mode which is conventionally thought of as removing a clock signal from the latches so that any value that is forced on the latches does not matter because it is not being read. As applied to the invention, algorithms for computing observability don't cares are in terms of the local fan out where it is known that there is no reconvergence, or in terms of global signals that are known to block all of the fan out of a path. This may be done in known ways, for example, by implementing "cut sets" which requires starting at the output and finding all of the fan out and determine if there is some place along each path that is blocked by a signal.

More specifically, one way in which the computation of ODCs may be performed is illustrated in FIG. 2. As shown in FIG. 2, the method involves defining a cut 35 in a logic network 10 having logic blocks 42 and 52 which intercepts all paths from the net of interest 40 (for which the ODCs are to be computed). Then, a computation is made of the conditions under which all of the nets in this cut are independent of the net of interest. The Boolean derivative of cut net C with respect to net N is designated as dC/dN. If C=f(N, . . .) then dC/dN=f(N=0, . . .) xor f(N=1, . . .). Net C is then independent of net N whenever dC/dN is zero, i.e., when the inverse of dC/dN is one. Taking the AND of the of these conditions for all nets in the cut set gives a set of ODC conditions for net N. To compute the total ODC set for net N a cut should 35' be taken at the primary outputs (i.e., logic block 52 in FIG. 2 should be empty).

There is a tradeoff in computing the ODCs between the amount of effort required and the completeness. To compute the ODC set requires analysis of all logic between the net and the cut. The complete ODC set for a net requires analysis of the entire fanout cone of the net. In contrast, if the cut is close to the net only a small amount of logic must be analyzed. Thus, for completeness, it is desirable to push the cut as far right (toward the network outputs) as possible, while for computation speed it is desirable to push the cut as far left (toward the net) as possible. This also extends to the incremental update of the ODC set; if a change is made in the logic between the net and the cut (logic block 42 in the FIG. 2) the ODC set must be computed. Thus, minimizing the size of logic block 42 will minimize the number of potential changes which would require recomputation of the ODC set.

In many cases the "sleep" states of a logic network are determined by signals which block propagation of results close to the outputs of the logic network. For example, one will often gate the clocks which latch the logic network outputs. In such cases the relevant ODCs may only be determined using a cut which is far from the net whose ODCs are being computed, and which thus makes the ODC set computationally expensive. One may obtain usable ODC set with lower cost by noting that any condition which is an ODC for all the nets in some cut through the fanout cone of net N is also an ODC for net N. Considering the illustration of the net 40 in FIG. 3, any condition which is an ODC for all nets in cut 35' is also an ODC for the net of interest. These conditions may be found using the Boolean derivative as described above, and then ANDing the condition across all nets in the cut. Likewise, the local ODC for the net can be computed with respect to cut 35 as described above. The OR of these two ODC sets is then also a valid ODC set for net 40. If logic blocks 42 and 62 are small relative to logic block 52, this can save significant time in the ODC computation. Furthermore, cut 35' can be shared among many nets, and thus only the local ODCs need be computed separately for each net.

Figure 3:
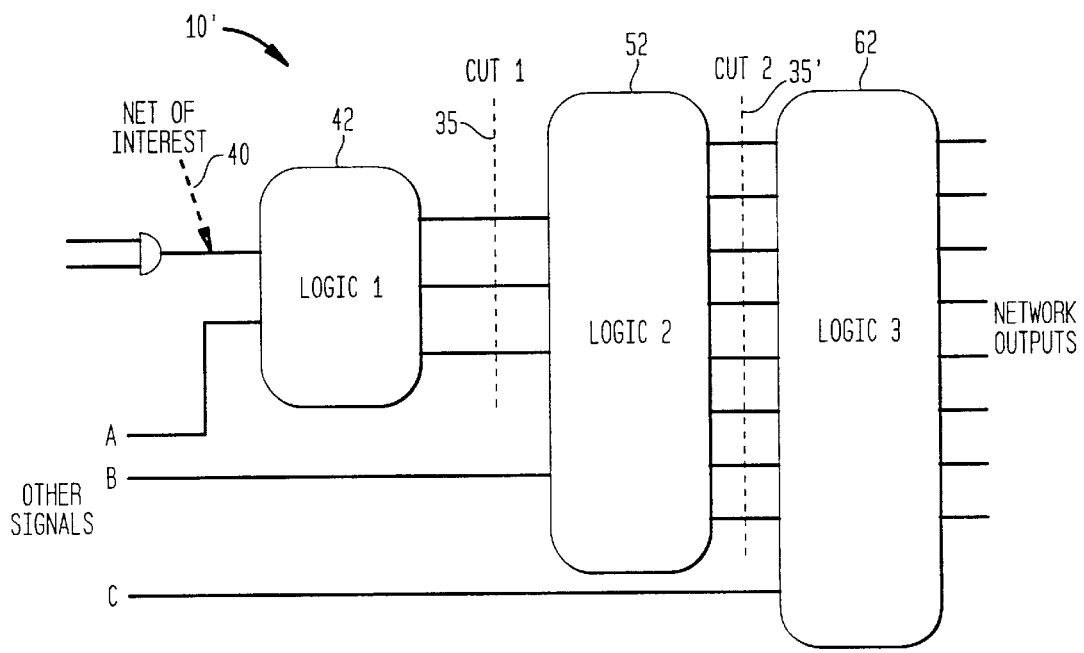

An incremental update of the ODCs can be computed by determining the ODCs using a pair of cuts as described above and then, when a logic change is made, determining which nets include the changed logic in their "logic block 42" or "logic block 62" from the FIG. 3.

It is understood, that in some implementations, it is not necessary to find the complete ODC set, but subsets thereof. That is, find a function that is simpler to compute and that for a large number of the cases is a don't care. Thus, when an action is taken to force this net, then it may be desirable to implement a subset of that function. In other words, a very complicated function may be too costly in terms of overhead to build logic to force the net. However, a signal in a simpler circuit may be found that is true 95% of the time this signal is true, and can be implemented at 5% of the cost in terms of logic GATES. Thus, the simpler function would be built even though it did not cover the whole ODC set, because there is always a trade-off between how much overhead to add versus how much of the time will the leakage be reduced.

Either way, according to the preferred embodiment of the invention, a probability analysis of the ODC state is performed. Thus, for each net, in addition to finding its function, i.e., what the value is of this net at any time in terms of primary inputs, there is also computed its ODC function which describes when the function may be changed. This is because, if an input is introduced that forces the net to a different value when the ODC is one, then the network behavior will not be changed. Contrarily, if an input is introduced that forces the net to a different value when the ODC is a zero, it is observable at an output and would constitute an illegal change in the function of the network.

Continuing, after having computed for each net, the function representing the ODC, the switching probability of the ODC is determined, i.e., how often is the function likely to switch in and out of that state. This is computed from the BDDs that are generated for these ODCs in terms of current and next state variables, which may be XOR'd (exclusive OR'd) to obtain a switching function for the ODC, resulting in the determination of its switching probability.

Thus, additional switching information described above may be used to determine whether to try to introduce an additional logic transition to force a net to a low leakage state (reducing leakage power, but increasing switching power) or to try to maintain the logical state of the net (potentially increasing leakage, but reducing switching power). If the net is forced to the low leakage state, the power expended will be the leakage power per cycle in the low leakage state times the expected number of cycles that the net will stay in the low leakage state, plus the switching power required to transition to and from that state. If it is not forced to the low leakage state, the power expended is just the expected power per cycle (determined probabilistically, considering both expected leakage and switching power) times that same number of cycles. By comparing these values it can be determined whether or not the power can be reduced by forcing the net to the low leakage state.

At the conclusion of this first phase, for each net there are obtained four (4) various functions: a state function (state) and switching probability function (state), and, a state function (ODC) and switching function (ODC). Once all of this information has been obtained, a trial and error method may be used for improving the leakage utilizing all of the determined information. It is understood that the incremental analysis described in aforementioned U.S. Pat. No. 5,508,937 may be taken into account for updating each of these functions.

Particularly, with regard to the trial and error method, the following analysis is performed: 1) randomly selecting a net; 2) finding its ODC; and 3) finding the various simplifications of that ODC which would be different networks (that would require varying amounts of logic in order to create). The ODC to be found may be independently selected based on the following desirable trade-off criteria: 1) it is maximally probable that the network will be in the ODC state; 2) it is minimally probable that it will switch in and out of this state a lot (which would be expensive in terms of switching power) and; 3) it is simple to compute. For example, if a new potential ODC function is found and if its probability is very low or its switching probability is very high, it may be skipped (for example, as likely being too expensive). After finding the ODC function, that is, determining the conditions under which the net may be forced to a certain state, then the net may be forced to a one or a zero. For example, one can force a signal to a zero by ANDing it with signal NOT(ODC) or by NORing it with signal ODC, and can force it to a one by ORing it with signal ODC or by NANDing it with signal NOT(ODC). The cost of the forcing logic is the cumulative power dissipation (both switching and leakage power) of the logic added to generate the forcing signal (the ODC subset) and to force the signal to a value. The cost/savings of the change adds this cost to the change in power due to leakage and switching due to the modified probabilities of the forced signal and its fanout.

Figure 4A:
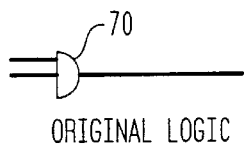
FIGS. 4(a)–4(c) illustrate example scenarios for forcing a logic state of a simple AND gate.
Figure 4B:
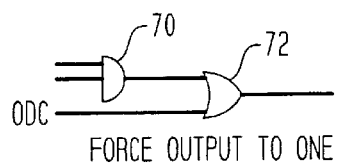
Figure 4C:
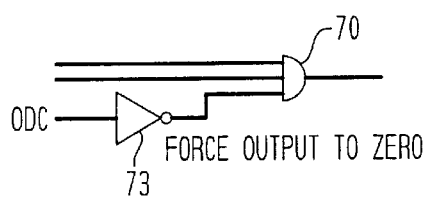

FIGS. 4(a)–4(c) illustrate example scenarios for forcing a logic state of a simple AND gate. Looking at the output net of an AND gate 70 in FIG. 4(a), it is determined that there is some ODC function for a net (possibly a subset of the complete ODC function for the net), and it is desirable to force this output to a one (1) when the ODC function is true. As a one (1) cannot be forced directly with an AND gate, an OR gate 72 may be placed at the output of the AND gate with the ODC function fed into the OR gate to force the AND to a one as shown in FIG. 4(b).

Alternately, to force the output of the AND gate 70 having a pair of inputs to a zero, then the ODC may be fed into the AND gate via an inverter 73 to invert the ODC which will force the AND gate to a zero. So once the ODC or subset of it is found, based on easy computation, high probability and low switching criteria, then the gate may be forced. It is understood that forcing the output of the net is going to cause some propagated effects. Thus an output forced to zero, may likely force some other nets to various states and likewise if the output is forced to one. Given the incremental analysis, once the action is taken to force the gate to a certain state (1 or 0), all of the affected probabilities may be recomputed, and additionally the leakage power and the switching power that is consumed by this network are recomputed and compared with the power that was expended prior to forcing the signal. If the power consumption is worse, then this change will be discarded.

Simulated annealing

It should be understood that this purely random method for forcing the state of the net may be implemented with other network optimizing techniques, such as simulated annealing, which provides a general optimization framework that is used for performing random kinds of optimizations involving simulating the thermodynamics of the crystallization of a crystal depending upon the forcing of logic states of the net and determining if the net is better or worse from a power consumption perspective. If the move makes things better, it is accepted. However, if it makes things worse, it is accepted with a probability that is related to the Boltzmann distribution which is a function of a pseudo variable called temperature. As known to skilled artisans, the annealing simulation works by starting at a high temperature where it is expected that lots of bad moves and lots of good moves will be accepted, and then the temperature is slowly lowered. As this process progresses and the temperature decreases, fewer bad moves will be accepted. There is extensive literature on annealing, for example, "Optimization by Simulated Annealing" by S. Kirkpatrick, C. D. Gelatt, and M. P. Veechi in Science, vol. 220, pp. 671–680, May 1983, and according to the invention, simulated annealing may be used with this random method.

Propagating back sensitivity information

In a second method for improving leakage, an additional "sensitivity analysis" which makes an informed decision of which net to use may be performed. That is, according to the invention, to help guide the optimization process and evaluate potential network changes, it is desirous to determine, for each net, the total effect which it has on leakage of the logic in its output cone. This could take the form (conceptually or literally) of a derivative of leakage power with respect to state probability. These values would be computed through a backward propagation of information through the logic network. For example, if an AND gate has an output probability of 0.25, a leakage derivative of D, and two inputs each with independent probabilities of 0.5, each input net has only a one half probability of affecting the output net, so the backward propagated contribution is 0.5*D. To this the leakage must be added due to the net itself, which will be the difference in leakage of the source gate for the net between the cases when the net is 0 and 1. It will be understood that leakage on a semiconductor chip occurs through gates and other circuits to which the nets are attached, and not in the nets themselves. Thus reference to the leakage of a net in a particular state, means the leakage occurring in those states in those circuits to which the net is attached. Similarly, references to the inputs of a net will be understood to mean the inputs to the gate driving the net.

The selection of changes may be done by selecting arbitrary possible changes from some set of possible changes and evaluating the potential benefit of each. It is preferable that specific changes will be selected which are expected to bring about an improvement in the optimization objectives. For example, as will be described, nets may be selected which: 1) have a high leakage power derivative; 2) have a potential for significantly changing their state probability; and 3) have a sufficiently positive slack to allow for the proposed transformation.

This additional analysis is a "sensitivity" analysis which may be more effective than the random approach as it involves the determination of the derivative of the probability that an output of an net is one (1), for example, with respect to the probability that each of its inputs (nets) is one and backward propagating backward through the network the derivative calculations. For instance, given an AND gate for a particular net which is more probably in a particular state e.g., the output has a probability of 0.8 of being a logic 1 and 0.2 probability of being a logic 0. This is going to be related to the probability on each of its input nets. Given totally independent nets (no reconvergence), then the probability that the output is 1 is really just the product of a probability that the two inputs are 1 (for the example AND gate) because the output is 1 only when all of the inputs are 1 so the product of the probabilities of the inputs gives the total probability. Likewise, this may be propagated back. For an OR gate, the output of an OR gate is a 1 only when either input is a 1, i.e., when both inputs are not zero, so for the two inputs the probability that the output is one is a quantity (1-(1-probability that first input is 1)×(1-probability that second input is 1)).

As an example, a leakage derivative of a net N is defined as the change in leakage power associated with a change in the state probability of N. This includes not only the change in leakage of the gate driving N, but also of all gates in the fanout of N whose input probabilities will be changed as a result of the change in state probability of N. It is difficult to compute this derivative exactly due to the effects of reconvergence in the logic network. However, it may be approximated efficiently by assuming for each gate that changes to all of its inputs can and will be made independently (i.e., will not be due to a change on a common net within their joint fanin cone). In this case, for each input of a gate, the change in the state probability of the gate output may be computed. This is multiplied times the leakage derivative of the output net and added to the change in leakage power of the gate itself due to the change in input probability to get the leakage derivative for the gate input pin. Finally the leakage derivatives for all the sinks of a net are added together to obtain the leakage derivative of the net itself.

Figure 5:
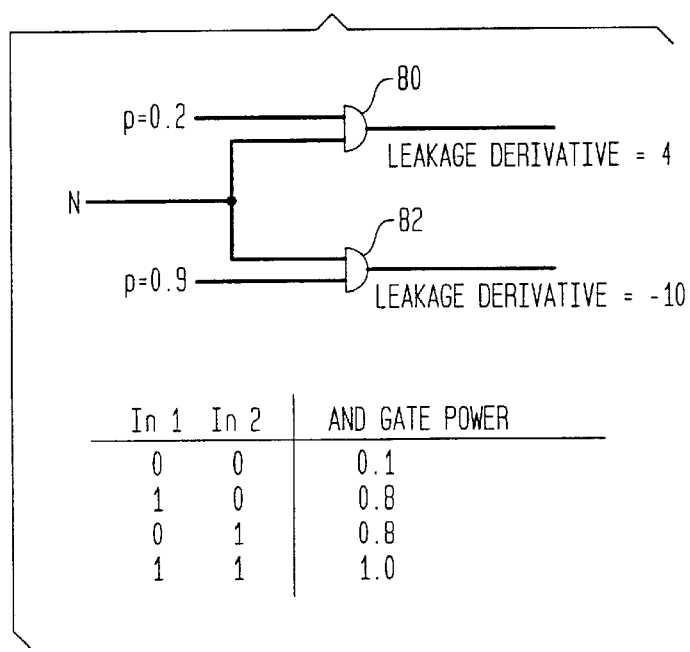
FIG. 5 illustrates an example application of the leakage derivative used in the sensitivity analysis according to the invention.

FIG. 5 illustrates an example application of the leakage derivative used in the sensitivity analysis according to the invention. In FIG. 5, the output probability of an AND gate 80 is the product of the input probabilities (state probability derivative of the upper gate 80 is 0.2 and that of the lower AND gate 82 is 0.9), and the respective leakage derivatives of the two nets with respect to the state probability of net N is computed. That is, 0.2*4=0.8 and 0.9*(−10)=−9.0, respectively (the leakage derivatives shown in FIG. 5 are with respect to the state probability of the nets themselves). The expected leakage of an AND gate with input probabilities p1 and p2 is then:

$$\text{Expected leakage} = 0.1(1-p1)(1-p2) + 0.8[p1(1-p2) + p2(1-p1)] + 1.0 p1 p2$$
$$= 0.1(1 - p1 - p2 + p1p2) + 0.8(p1 + p2 - 2p1p2) + 1.0 p1 p2$$
$$= 0.1 + 0.7p1 + 0.7p2 - 0.5p1p2$$

The leakage derivative of the gate itself with respect to p1 is 0.7−0.5p2. Thus the leakage derivative of the upper gate is 0.7−0.5*0.2=0.6, and that of the lower gate is 0.7−0.5*0.9=0.25. Thus, the total leakage derivative of net N is then 0.8+0.6−9.0+0.25=−7.35. This indicates that decreasing the switching probability of net N from, for example, 0.4 to 0.3 would save about 0.735 units of leakage power.

As this is only an approximation of the true leakage derivative it can be used to guide optimizations. The results may be checked with a more accurate incremental power analysis using (for example) the BDD-based methods as discussed. Additionally, there may be cases where changing the probability of two inputs to a gate may reduce power, while changes to the probability of any one input itself will increase power. Such opportunities for power minimization cannot be found using the leakage derivative method, but the downstream consequences of such changes may be found in this manner.

It is understood that the sensitivity information, i.e., finding the derivative of the probability that a signal is one with respect to the probability that each of the inputs of the gate driving it is one and propagating backward, is correlated with the power consumption. That is, by taking, for each input of the driving gate, the probability that the input controls the gate output value (e.g., for an AND gate, the probability that all other gate inputs are one), multiplying that by the derivative of the leakage power with respect to the state probability of the net (gate output), and then adding this quantity to the difference between the leakage power of the driving gate itself when the input is a one and the leakage power of the driving gate itself when the input is a zero, a more informative leakage derivative may be obtained. Thus the derivative of the expected leakage current may be propagated back to thereby obtain a sensitivity measure on each net. This is valuable in that, it permits the calculation of the expected change in total leakage current looking forward given a change in the forced net based on the probability analysis.

That information is valuable in that, an objective measure of the proposed expected change in total leakage current may be compared with the cost of adding logic necessary, for example, to force the signal. Thus, rather than taking the trial and error approach to select potential network changes, the analysis phase of the invention includes the sensitivity analysis and requires an additional step of sorting through the nets according to their sensitivity. Thus, a local estimate may be made of the expected change in state and switching probabilities, for example, taking an AND of the (NOT) ODC function with the state function for a particular net and finding the new switching and state probabilities locally, and then using the sensitivity information to estimate the propagated effects of the local change. Because there may be correlation between the ODC function and the original state function for the net, it is preferable to compute the probability of this ANDed function rather than simply multiplying the state probability by the probability of the inverse ODC function. Multiplying this expected change with the leakage derivative for each of the nets of the design, sorting them, and picking the best one first, is an improvement upon the purely random approach.

At this point, the analysis has included the determination of the locations in the network where ODCs may be used to force logic and, in conjunction with the switching probability, to reduce leakage. The analysis for determining ODC's is further based on a trade-offs based on criteria such as 1) maximizing the probability of being in the ODC state; 2) minimizing the probability of switching in and out of this state a lot, which would be expensive, and; 3) computational simplicity, and preferably, how the sensitivity may be used in the analysis to find a good place to force the logic. Alternately, a simpler greedy method may be performed which requires randomly trying several the nets and picking the best one. This may also be performed in accordance with a simulated annealing technique as described herein.

Based upon this analysis, any one of these methods, e.g., the trial and error method, attempts one of these perturbations and measures the results: if the result of the application of this method is forcing a fixed state at a net location, the next step is to evaluate the tradeoff between 1) gating the signal that came in, e.g., placing an additional OR gate at the location (putting in some external logic) or, 2) possibly replacing the subject gate so it has an additional input, for example. For the first case requiring placement of gated logic, the insertion of the logic may have a delay impact in the signal, and may or may not impact the delay of other propagating signals depending upon when the arrival time of the signal. If it does impact the signal delays, it might trigger some other changes to mitigate this impact, and the aggregate performance cost of that in terms of delay, power consumption, noise, etc. is evaluated. Alternately, with respect the second case requiring replacement of a first gate for the net having an extra input, for example, there is maintained an associated library element describing characteristics of the gate. For example, for a two input NAND gate, there is an associated three input NAND gate library element maintained having an extra input. For this result, replacement of the gate may provide the same benefit, however, with less delay or power consumption etc., and may constitute a better alternative. Thus, in the design, besides the objectives of reducing power, performance constraints must be evaluated, in the sense that the slowest path in the entire chip, for example, will limit how fast that whole chip will perform. The chip performance may be specified, it may have some external timing requirements it has to satisfy, i.e., it may have to be at least that fast. In other words, if the chip delays are such that they do not meet these requirements, the chip is technically non-functional. Similarly, in other domains such as noise analysis there are constraints which must be met or, under certain circumstances, or the chip will not be functional. Thus power minimization must be done subject to such functional constraints.

Algorithm

Figure 6:
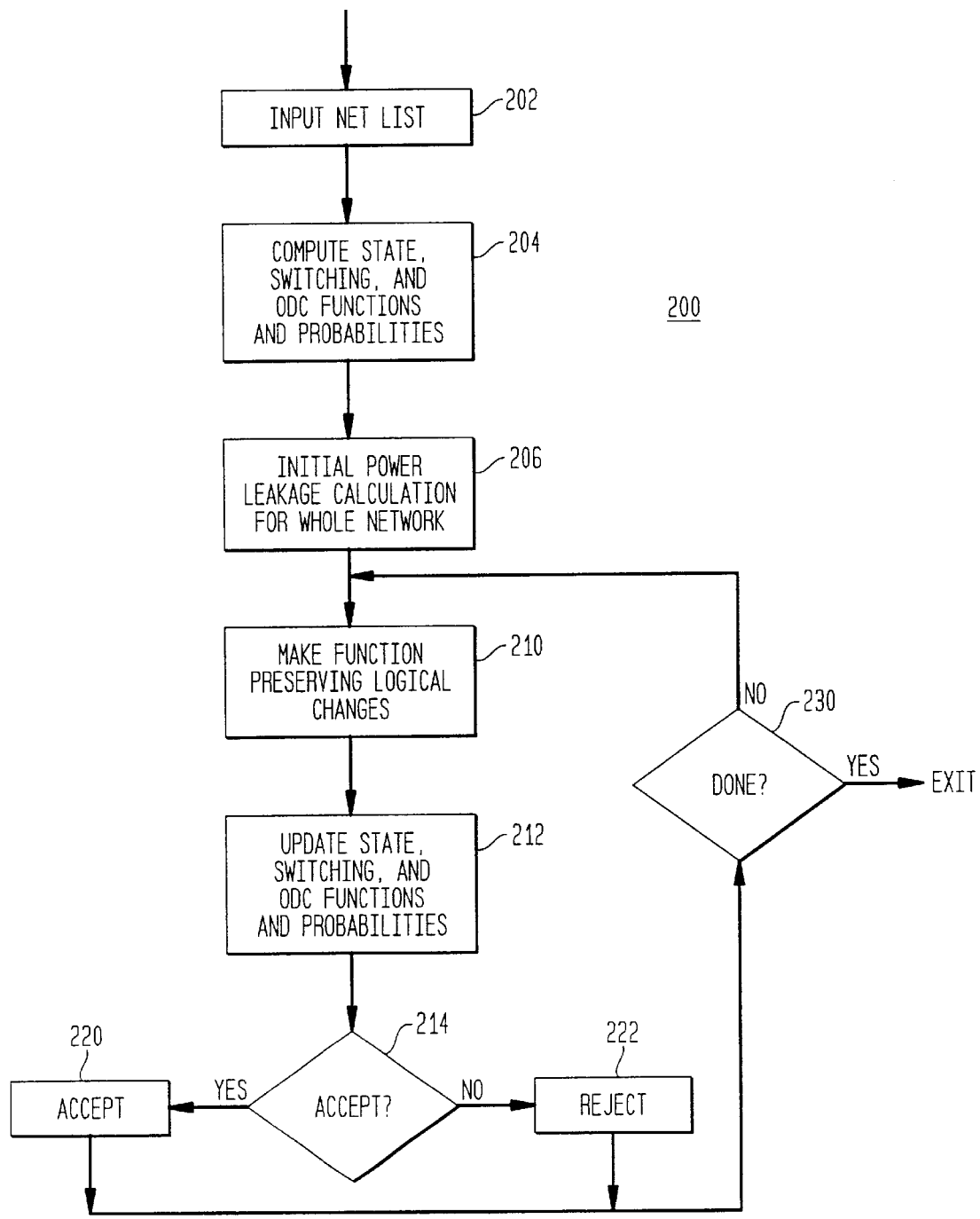
FIG. 6 is a block diagram illustrating conceptually the logic system design methodology according to the principles of the invention.

FIG. 6 is a block diagram illustrating conceptually the logic system design methodology according to the principles of the invention. The methodology 200 according to the preferred embodiment of the invention includes a first step of inputting a net list that is to be operated on. Then, as indicated at step 204, an additional step requires computing the state switching and ODC functions and probabilities, and at step 206, making an initial power calculation for the network as a whole. Next, at step 210, there is the step of forcing a logical change to the net while preserving function. This may require the steps of: choosing one or more places to force a net, buffering, cloning etc. More specifically, the types of changes that may be made includes many conventional logic synthesis changes, including but not limited to the following: 1) changing the polarity of logic signals; 2) factoring a gate; 3) cloning a gate (making a copy of a gate and distributing its fanout between the original and the copy); 4) adding buffers; 5) performing "rewiring" transformations (adding and deleting redundant connections of logic signals to gates); and, 6) performing "retiming" transformations (moving logic across latch boundaries). If the logic synthesis function is done in the presence of physical information (e.g., block placements), the changes may also include the following: 7) moving a gate to a new location; and 8) changing the routing of a net. In addition to these, new types of changes specifically aimed at reducing leakage power may be implemented, including: 9) addition of a gate to force the net to its low leakage state whenever the net value is a don't care; 10) if the output of a master slave latch is a don't care in a given state, forcing the slave latch to the state which gives the lowest leakage power. An extra state may be added to the sequential behavior of the network to force the correct logical value (stored in the master latch) back into the slave in the cycle or half cycle before the latch value is next needed; and 11) addition of extra inputs to a gate to cause extra transistors to be placed in series with a high leakage path when the gate output is a don't care. For example, a NOR gate which is high has two parallel NFETs through which leakage can occur. By converting the gate to a 2-1 OAI (or-and-invert gate) and adding to the extra AND, an input which is high whenever the output of the gate is not a don't care, the leakage at the gate may be reduced.

In some cases a large portion of the logic network (a number of nets) will be likely to be in a sleep state simultaneously much of the time. This is often the case when functional units (e.g., a multiplier) are switched off when not in use. In such cases more intelligent choices may be made about the types of changes to make by considering a set of changes together, to better account for the interactions between them. This can be done using the following steps:

1. To find a sub-network in which for leakage current it to be reduced. The outputs of the sub-network should share a don't care function which has a high probability of being stable for a relatively long time. An example would be all the outputs of a functional unit which is architecturally forced into a sleep mode. Such a sub-network can also be found by finding a common cut-set which intercepts all fanout of the sub-network, such that the AND of the ODCs for all nets in the common cut-set has high probability of being one. For example, in FIG. 3, a subnetwork might be defined to include all nets and blocks whose fanout are completely intercepted by cut 35'. The sub-network inputs may be latches or intermediate signals at which logical values may be forced;

2. To independently force the value on each sub-network input to both zero and one, determining which gives the lowest leakage (i.e., temporarily force the input to each value). This requires a number of pattern applications equal to twice the number of sub-network inputs (note that if the sub-network input was already forced to a value the signal only needs to be forced to its opposite value). If no change in value forcing reduces the power, or if the cost of the additional logic required to force the input exceeds the benefit achieved, the application is done and the desired low leakage state is found. Otherwise, the application forces the maximum benefit input to the value determined to give the greatest benefit; and, 3. Repeat step 2 until no further improvement is found.

An illustration of these steps are now provided in FIGS. 7(a)–7(d). FIG. 7(a) illustrates an example logic network 100 having four inputs labeled a, b, c, and d. The shaded regions 102, 104, 106 and 108 emanating from these inputs represent the respective fanout cones of the inputs. As can be seen, the fanout cones of inputs a and b overlap, as do those of inputs b and c. In this example the search for a low leakage vector is commenced by setting all inputs to zero and the cost to force the inputs to either one or zero will be assumed to be zero. In the more general case these signals may already have a state probability determined, e.g., by the BDD methods already mentioned, and some additional logic with an associated cost will be required to force each input. In the simplest approach, as illustrated in FIG. 7(b), for each respective input, the change in overall power is determined if that input were changed by itself Then the input showing the largest power reduction (shown "circled" in the FIG. 7(b)) is selected and that input is accordingly changed. The process then repeats until, in step 4, no more power improvements are possible.

A variation of this method, depicted in FIG. 7(c), is to find clusters of inputs whose fanout cones don't overlap. Some of the directed search in step 2 may be performed in parallel by determining the overlap between the fanout cones of the various sub-network inputs and latches. Instead of forcing values one at a time, any number of values may be forced whose fanout cones do not overlap, and whose influence on leakage power, therefore, do not interact. This is done by partitioning the inputs up front into non-overlapping cones, and selecting at most one input to force out of each partition. In this example, one cluster includes inputs a, b, and c, and a second cluster includes only input d. The power change is then found for each primary input, as above, but now the input from each cluster which gives the best power reduction is selected. In the example depicted in FIG. 7(c), input c is chosen from the first cluster and d from the second cluster and they are changed simultaneously. This process then repeats until no further power reduction is possible. As shown in FIG. 7(c) all possible changes in step 3 increase power.

Alternatively, a more sophisticated graph coloring algorithm may be used to find the maximum one-colorable set which will represent the largest set of inputs which can be forced simultaneously. Such a coloring algorithm may be weighted by the amount of leakage reduction produced by forcing each input under consideration. Thus, as depicted in FIG. 7(d), a graph of the inputs is created, where an edge is present between any pair of inputs whose fanout cones do not overlap. Again the power change for each primary input is determined. Then, the maximal independent subset of the subgraph containing only the nodes corresponding to inputs whose change would reduce power is found. The maximal independent set is the set of nodes with the maximum total weight (where the weight is the amount of power reduction possible by changing the node) which can be colored with a single color by a graph coloring algorithm. In the example depicted in FIG. 7(d) all inputs showing a power reduction are independent, so all can be changed simultaneously. All nodes in this maximal independent set are changed and the process then repeats until in step 2 no further power reduction is possible.

Alternatively, the overlap may be determined by creating a conflict matrix in which a "1" is entered if the fanout cones of two sub-network inputs overlap. The selection of a set of inputs to simultaneously force may then be done by a greedy method in which the first input which reduces power is chosen as the one to force and one-by-one add to the set of inputs to force all those whose fanout does not overlap with any added so far.

In another embodiment, it is possible to start from randomly determined sets of forced values on sub-network inputs, rather than beginning with unforced signal probabilities. A variety of such random starting points might be used and a directed search conducted from each as described above. This would help to avoid local minima in the problem space. Simulated annealing methods may also be applied to the above search to avoid local minima.

Returning to FIG. 6, after forcing the net by making a change, the next step 212 involves updating the probabilities, the functions, the power calculation, etc., and, at step 214 deciding whether to accept or reject the proposed function preserving logical changes in accordance with the acceptable performance criteria, i.e., delay, noise, power consumption etc. Thus, at step 220, the proposed logical change may be acceptable if the move lowers the total aggregate cost in which case the forced logical change may be implemented in the design. Otherwise, as indicated at step 222, the proposed change may be rejected in which case the design change is undone. After the acceptance or rejection of the proposed change, the process proceeds to step 230, at which it is determined whether additional changes should be made. This determination may be made, for example, by seeing whether the design objectives have been met, by seeing whether the run time of the process has reached some specified limit, or by seeing whether significant improvements have been made over the past several iterations. If it is determined that further changes should not be made, the process finishes. Otherwise the process is repeated by looping back to step 210 where new function preserving logical changes are made.

Figure 8A:
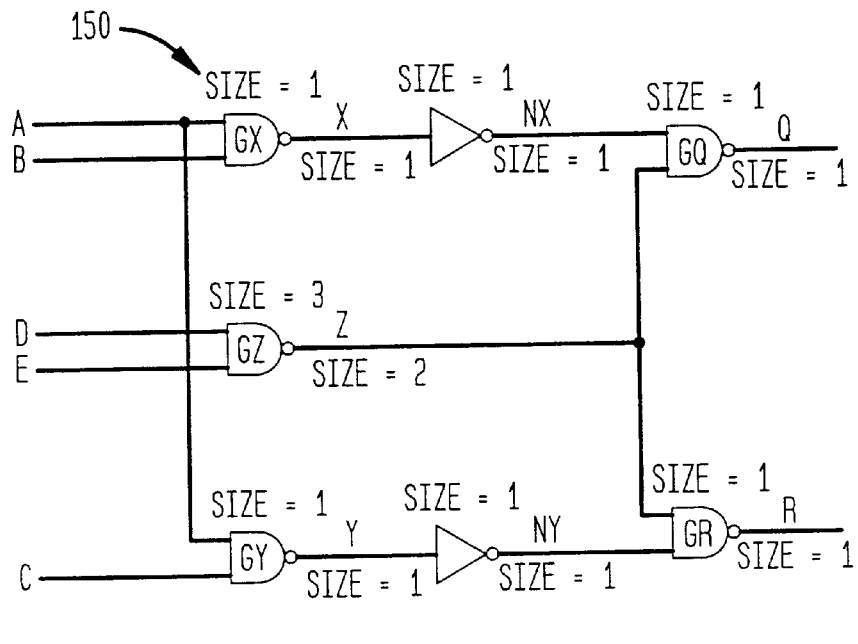
FIG. 8(a) illustrates an example logic network 150 subject to the probabilistic analysis performed in accordance with the methodology of the invention.

There is now provided an example of the application of the overall method. FIG. 8(a) illustrates an example logic network 150 to which the methodology of the invention is applied. Each net, e.g., nets X, Y, Z, Q, R, will have a size (capacitance) related to the number of sinks and the total length of wire. Each gate, e.g., gates GX, GY, GZ, GQ, GR, will also have a size which is related to the size of its output net and to its timing requirements (e.g., more timing critical gates will be larger). The switching power for each net is ½ $pCV^2$, where f is the clock frequency, p is the net switching probability, C is the net capacitance, and V is the supply voltage. This is proportional to the net capacitance and the switching probability. The leakage power for each gate is proportional to the gate size. The leakage power for the gates used for the example logic network 150 are shown in the tables provided in FIGS. 9(a)–9(c). The value for each state is multiplied by the probability of that state occurring, and the sum is multiplied by the gate size to obtain the expected average gate leakage power. The net switching power will be computed as 100 times the net size multiplied by the switching probability.

Figure 10A:
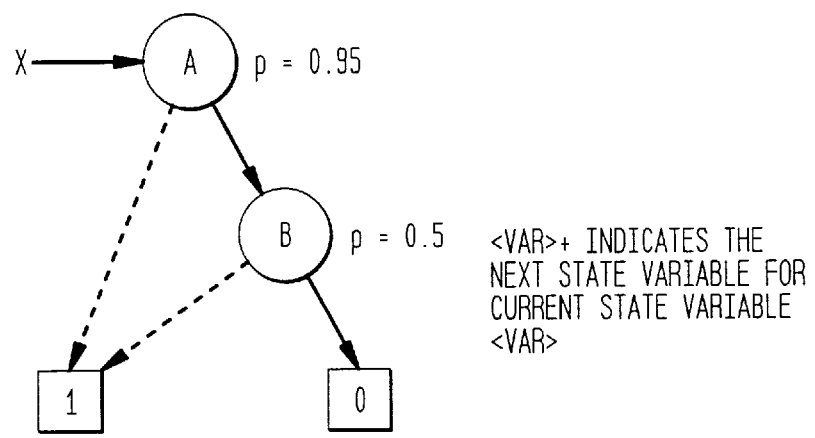
FIGS. 10(a) and 10(b) illustrate the BDDs and node probabilities for net X of the example logic network 150 of FIG. 8(a).
Figure 10B:
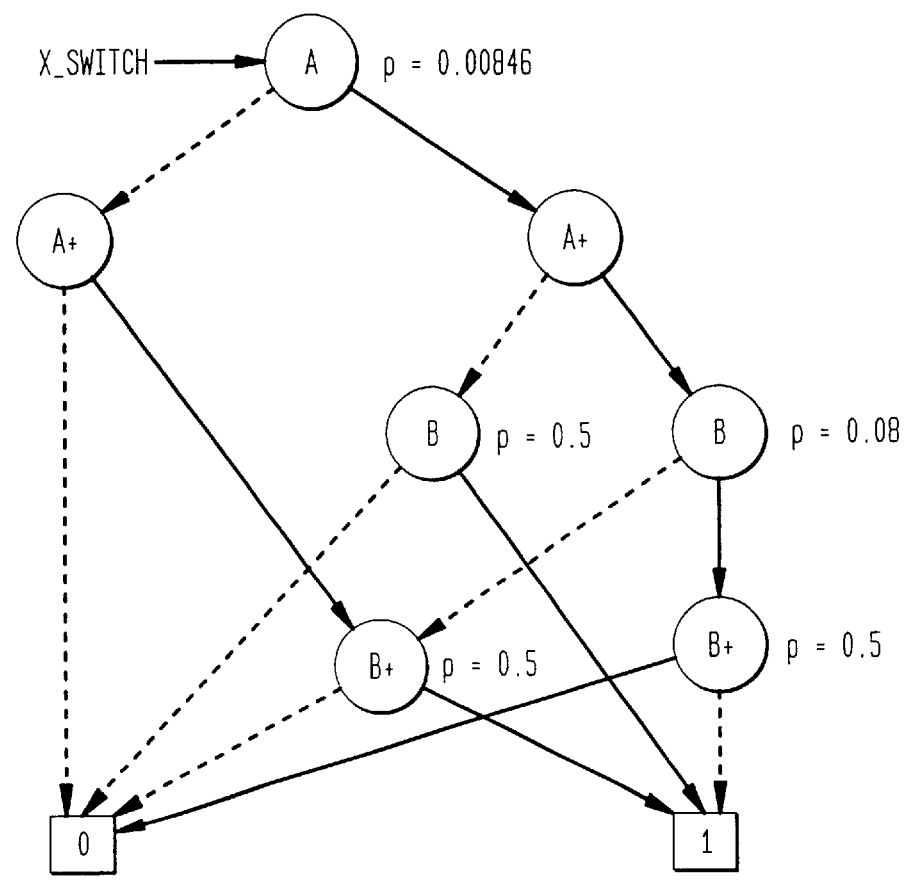

The signal (state) probabilities on the primary inputs A–E of net 150 are indicated in FIG. 9(d) and are generally derived from system-level simulation. Switching probabilities are additionally determined for each signal, i.e., the probability that the signal changes from one (1) to zero (0) or from zero to one between any given pair of consecutive cycles. Similarly, for each gate the probability of each input condition which causes a different leakage power, is determined. This is done via the BDD-based methods as described earlier. As an example, the BDDs and node probabilities for net X are shown in FIGS. 10(a) and 10(b). The probabilities and resulting switching power for each net are indicated in FIG. 11(a). The probabilities and resulting leakage power for each gate are shown in FIGS. 11(b) and 11(c). So the total expected average leakage power for the network is 13.0033.

Figure 8B:
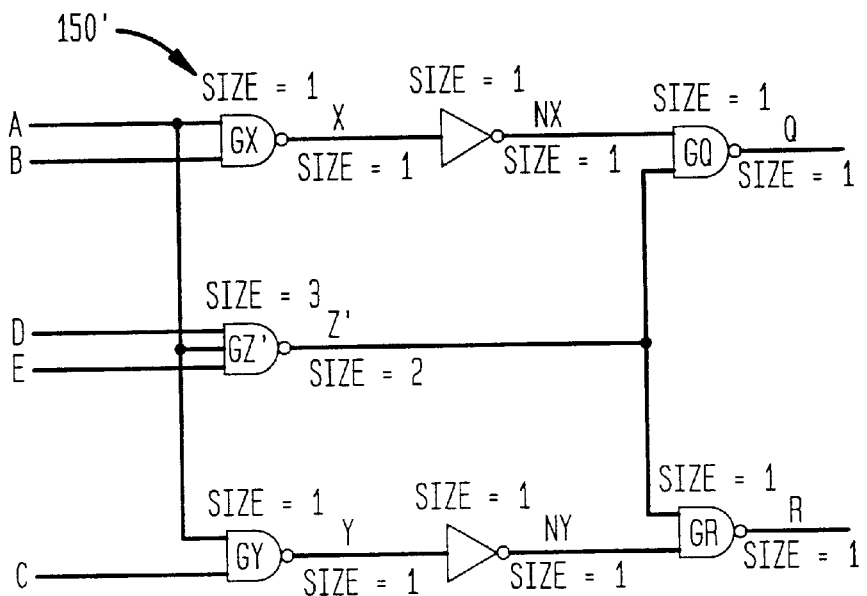
FIG. 8(b) illustrates the resulting logic network 150' corresponding to the network of FIG. 8(a) that is designed for reduced leakage power after applying methodology of the invention.

Since gate GZ has the largest leakage power, the ODCs are generated for net Z to see if another input to gate Z may be added to reduce the leakage. The ODC for Z is:
NOT(A) OR (NOT(B) AND NOT(C)),
determined by taking the Boolean derivative with respect to Z of Q and R (which form a cut through all fanout of Z), and the probability that this condition is true is 0.925. No signal exists in the logic network to represent this function, but it is found that the inverse of signal A is a subset of ODC(Z). The BDDs can easily be used to determine whether signal J is a subset of signal K (i.e., J implies K) by computing the function J AND NOT(K). If this computed function is always false, J is a valid subset of K. Back to the example for the logic network 150 of FIG. 8(a), signal A also has a low probability of being one (so its inverse has a high probability of being one) and a low probability of switching, so it is a good candidate to try to reduce leakage. Since it is acceptable to add the inverse of a valid ODC (or subset) for a net as an input to an AND or NAND gate driving that net, an attempt is made to add A as an additional input to gate GZ. The resulting network 150' is illustrated in FIG. 8(b). The probabilities for and resulting switching power for each net in this modified network are indicated in FIG. 12(a). The probabilities and resulting leakage power for each gate in this modified network are indicated in FIGS. 12(b)–12(d). The total expected power for the network is 10.48715, which is less than the original (including in this example reductions in both leakage power and switching power), so the modification is retained.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for reducing leakage power of a logic network comprising a plurality of nets, comprising the steps of:

a) determining observability don't care (ODC) information for one or more first nets in said logic network, said ODC information representing a set of input values for which the values at said first nets have no influence on any output value of the logic network, said ODC information being used for identifying sleep states for first nets of said logic network;

b) performing a simulation to force at least one selected net from said first nets to a particular value during at least a portion of at least one of said identified sleep states and performing a probabilistic analysis to determine at least one net in which expected power consumption will be reduced; and c) forcing said selected nets to said particular value for said portion of a sleep state when expected power consumption is reduced.

2. The method for reducing leakage power of a logic network as claimed in claim 1, wherein said step of performing a probabilistic analysis comprises the steps of:
   determining a probability of each of one or more chosen nets being in a first logic state and having a respective first leakage power characteristic value, and a probability of each said chosen nets being in a second logic state and having a respective second leakage power characteristic value; and,
   for each of said chosen nets, multiplying a first state power leakage with its respective first state probability value; and, multiplying a second state power leakage with its respective second state probability value; and,
   estimating the resultant leakage power for said chosen nets.

3. The method for reducing leakage power of a logic network as claimed in claim 2, wherein each of said chosen nets feeds at least one logic input of at least one gate element driving a respective net, said method further including: recomputing probabilities of nets in a fanout cone of logic changes based on updated probabilities at the inputs of said gate elements.

4. The method for reducing leakage power of a logic network as claimed in claim 3, wherein said step of determining a net in which expected power consumption is reduced includes a determination of power consumption savings, said method further including: accounting for effects on the power consumption of circuits in a fanout cone of a forced net.

5. The method for reducing leakage power of a logic network as claimed in claim 2, wherein said step of performing a probabilistic analysis further comprises the steps of:
   for each chosen net, computing the probability that that net will switch from a first logic state to a second logic state or from a second logic state to a first logic state; and,
   determining how long each chosen net is likely to be in a particular state;
   and, estimating the resultant power for each chosen net.

6. The method for reducing leakage power of a logic network as claimed in claim 2, wherein said step of determining observability don't care information includes determining the switching probability of the ODC.

7. The method for reducing leakage power of a logic network as claimed in claim 6, wherein the selection of the at least one net forced to a value in step b) is based on one or more criteria of: whether it is maximally probable that the selected net will be in the ODC state; and, whether it is minimally probable that the selected net will switch in and out of this state.

8. The method for reducing leakage power of a logic network as claimed in claim 7, wherein said sleep state portion includes a subset of all valid sleep states and a computation of said sleep state portion is simple to compute.

9. The method for reducing leakage power of a logic network as claimed in claim 6, wherein said step b) of performing a simulation to force said selected net to a particular value includes changing the polarity of logic signals at an input to said net.

10. The method for reducing leakage power of a logic network as claimed in claim 6, wherein said step b) of performing a simulation to force said selected net to a particular value includes factoring a gate.

11. The method for reducing leakage power of a logic network as claimed in claim 6, wherein said step b) of performing a simulation to force said selected net to a particular value includes making a copy of a gate and distributing its fanout between an original net and a copy net.

12. The method for reducing leakage power of a logic network as claimed in claim 6, wherein said step b) of performing a simulation to force said selected net to a particular value includes adding one or more buffers.

13. The method for reducing leakage power of a logic network as claimed in claim 6, wherein said step b) of performing a simulation to force said selected net to a particular value includes adding and deleting redundant connections of logic signals to gates.

14. The method for reducing leakage power of a logic network as claimed in claim 6, wherein said step b) of performing a simulation to force said selected net to a particular value includes adding circuitry at an input to force said net to a low leakage state whenever the net value is a don't care.

15. The method for reducing leakage power of a logic network as claimed in claim 14, wherein said step of determining a net in which expected power consumption is reduced includes accounting for the power consumption required by said circuitry used to force the selected net to the determined value.

16. The method for reducing leakage power of a logic network as claimed in claim 6, further including the step of:
   for each chosen net, determining a total effect a change has on leakage of the logic in its output cone by calculating a derivative of leakage power with respect to a state probability, said leakage derivative of a net representing a change in leakage power associated with a change in a state probability of the net; and
   propagating backward through the network and performing the derivative calculations.

17. The method for reducing leakage power of a logic network as claimed in claim 1, wherein following said step c) of forcing said selected net, is the step d) of: updating said ODC and probabilistic information; and repeating steps b)–d) until a predetermined condition is met.

18. The method for reducing leakage power of a logic network as claimed in claim 1, wherein the determination of the portion of a sleep state includes maximizing the probability that the logic network will be in the determined portion of the sleep state.

19. The method for reducing leakage power of a logic network as claimed in claim 1 wherein the determination of the portion of a sleep state includes maximizing the length of time that the logic network stays in the determined portion of the sleep state once it has entered that determined portion.

20. The method for reducing leakage power of a logic network as claimed in claim 1, wherein the determination of the portion of a sleep state includes maximizing the number of nets for which the determined portion of a sleep state is also a portion of a sleep state, wherein one ODC function may be shared among a plurality of nets to force said plurality of nets.

21. The method for reducing leakage power of a logic network as claimed in claim 20, wherein said forcing step further includes: forcing several nets to logic values simultaneously, said forcing step comprising the steps of:
   independently setting each net to both a logic zero (0) and logic one (1) and determining a change in expected power dissipation in each setting;
   selecting at least one net which will be forced to the state which gives the maximum power savings; and repeating the independently setting and selecting steps until a predetermined condition is met.

22. The method for reducing leakage power of a logic network as claimed in claim 21, wherein the selecting step includes choosing a set of nets which have non-overlapping fanout cones.

23. The method for reducing leakage power of a logic network as claimed in claim 1, wherein the ODC state may be partitioned so that a selected net is forced into different states during different portions of the sleep state.

24. A method for reducing leakage power of a logic network comprising a plurality of nets, comprising the steps of:

a) computing state, switching functions for nets in a logic network and probabilities thereof and, computing observability don't care (ODC) functions used for identifying sleep states for nets of said logic network and, probabilities thereof;

b) calculating an initial power leakage calculation for one or more of said nets;

c) determining one or more function preserving logical changes for at least one selected net of said one or more nets and, simulating said changes to force said selected net to a particular value during at least a portion of a sleep state;

d) updating said state, switching functions and observability don't care (ODC) functions for chosen nets of said logic network and, updating said probabilities thereof in light of said changes;

e) calculating power leakage changes for the chosen nets resulting from the forcing of said selected nets; and f) deciding whether to accept or reject the proposed function preserving logical changes in accordance with acceptable performance criteria.

25. The method for reducing leakage power of a logic network as claimed in claim 24, wherein said deciding step includes the step of: repeating steps c) through f) until acceptable performance criteria is satisfied.

26. The method for reducing leakage power of a logic network as claimed in claim 25, wherein the acceptable performance criteria includes the power consumption of said network.

27. The method for reducing leakage power of a logic network as claimed in claim 25, wherein the acceptable performance criteria includes signal propagation delay through said network.

28. The method for reducing leakage power of a logic network as claimed in claim 25, wherein the acceptable performance criteria includes noise levels within said network.

29. The method for reducing leakage power of a logic network as claimed in claim 24, wherein wherein the selection of the at least one net forced to a value in step c) is based on one or more criteria of: whether it is maximally probable that the selected net will be in the ODC state; and, whether it is minimally probable that the selected net will switch in and out of this state.

30. The method for reducing leakage power of a logic network as claimed in claim 29, wherein said sleep state portion includes a subset of all valid sleep states and a computation of said sleep state portion is simple to compute.

31. The method for reducing leakage power of a logic network as claimed in claim 24, wherein said step c) of determining one or more function preserving logical changes for forcing said selected net to a particular value includes one or more selected from the group of: changing the polarity of logic signals at an input to said net; factoring a gate of said network; making a copy of a gate and distributing its fanout between an original net and a copy net; adding one or more buffers; and, adding and deleting redundant connections of logic signals to gates.

32. The method for reducing leakage power of a logic network as claimed in claim 24, wherein said step c) of determining one or more function preserving logical changes for forcing said selected net to a particular value includes adding circuitry at an input to force said net to a low leakage state whenever the net value is a don't care.

33. The method for reducing leakage power of a logic network as claimed in claim 32, wherein said step of determining a net in which expected power consumption is reduced includes a determination of power consumption savings, said method further including: accounting for effects on the power consumption of circuits in a fanout cone of a forced net.

34. The method for reducing leakage power of a logic network as claimed in claim 32, wherein said step of determining a net in which expected power consumption is reduced includes accounting for the power consumption required by said circuitry used to force the selected net to the determined value.

35. The method for reducing leakage power of a logic network as claimed in claim 24, further including the step of:

for each chosen net, determining a total effect a change has on leakage of the logic in its output cone by calculating a derivative of leakage power with respect to a state probability, said leakage derivative of a net representing a change in leakage power associated with a change in a state probability of the net; and propagating backward through the network and performing the derivative calculations.

36. The method for reducing leakage power of a logic network as claimed in claim 24, wherein the determination of the portion of a sleep state includes maximizing the probability that the logic network will be in the determined portion of the sleep state.

37. The method for reducing leakage power of a logic network as claimed in claim 24, wherein the determination of the portion of a sleep state includes maximizing the length of time that the logic network stays in the determined portion of the sleep state once it has entered that determined portion.

38. A program storage device readable by machine, tangibly embodying a program of instructions executable by the machine to perform method steps for reducing leakage power of a logic network comprising a plurality of nets, the method comprising the steps of:

a) determining observability don't care (ODC) information for one or more first nets in said logic network, said ODC information representing a set of input values for which the values at said first nets have no influence on any output value of the logic network, said ODC information being used for identifying sleep states for first nets of said logic network;

b) performing a simulation to force at least one selected net from said first nets to a particular value during at least a portion of at least one of said identified sleep states and performing a probabilistic analysis to determine at least one net in which expected power consumption will be reduced; and c) forcing said selected nets to said particular value for said portion of a sleep state when expected power consumption is reduced.

39. The program storage device readable by machine as claimed in claim 38, wherein said step of performing a probabilistic analysis comprises the steps of:

determining a probability of each of one or more chosen nets being in a first logic state and having a respective first leakage power characteristic value, and a probability of each said chosen nets being in a second logic state and having a respective second leakage power characteristic value; and, for each of said chosen nets, multiplying a first state power leakage with its respective first state probability value; and, multiplying a second state power leakage with its respective second state probability value; and, estimating the resultant leakage power for said chosen nets.

40. The program storage device readable by machine as claimed in claim 39, wherein each of said chosen nets feeds at least one logic input of at least one gate element driving a respective net, said method further including: recomputing probabilities of nets in a fanout cone of logic changes based on updated probabilities at the inputs of said gate elements.

41. The program storage device readable by machine as claimed in claim 40, wherein said step of performing a probabilistic analysis further comprises the steps of:

for each chosen net, computing the probability that that net will switch from a first logic state to a second logic state or from a second logic state to a first logic state; and, determining how long each chosen net is likely to be in a particular state;

and, estimating the resultant power for each chosen net.

42. The program storage device readable by machine as claimed in claim 39, wherein said step of determining observability don't care information includes determining the switching probability of the ODC.

43. The program storage device readable by machine as claimed in claim 42, wherein the selection of the at least one net forced to a value in step b) is based on one or more criteria of: whether it is maximally probable that the selected net will be in the ODC state; and, whether it is minimally probable that the selected net will switch in and out of this state.

44. The program storage device readable by machine as claimed in claim 38, wherein following said step c) of forcing said selected net, is the step d) of: updating said ODC and probabilistic information; and repeating steps b)–d) until a predetermined condition is met.

45. The program storage device readable by machine as claimed in claim 44, wherein said sleep state portion includes a subset of all valid sleep states and the computation of said sleep state portion is simple to compute.

46. An integrated circuit device of reduced power consumption comprising:

a logic network comprising one or more nets capable of being placed in a sleep state wherein a set of input values at said nets have no influence on any output value of the logic network, at least one net capable of being forced to a particular value so as to exhibit reduced power consumption as previously determined by a probabilistic analysis; and a device in said logic network for forcing said selected net to said particular value during a sleep state when expected power consumption is reduced.

* * * * *